United States Patent
White et al.

(10) Patent No.: US 7,466,520 B2
(45) Date of Patent: Dec. 16, 2008

(54) CO-LOCATED MICROACTUATOR LEVER ASSEMBLY

(75) Inventors: Andrew D. White, Brooklyn Park, MN (US); Wayne A. Bonin, North Oaks, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 345 days.

(21) Appl. No.: 10/960,266

(22) Filed: Oct. 7, 2004

(65) Prior Publication Data

US 2006/0077594 A1 Apr. 13, 2006

(51) Int. Cl.
*G11B 5/56* (2006.01)
*G11B 21/21* (2006.01)

(52) U.S. Cl. .................. 360/294.4; 360/294.6
(58) Field of Classification Search .............. 360/294.4, 360/294.6
See application file for complete search history.

(56) References Cited

U.S. PATENT DOCUMENTS

| | | | |
|---|---|---|---|
| 6,088,187 A | 7/2000 | Takaishi | 360/78.05 |
| 6,320,730 B1 | 11/2001 | Stefansky et al. | 360/294.4 |
| 6,376,964 B1 | 4/2002 | Young et al. | 310/311 |
| 6,697,211 B2 | 2/2004 | Koganezawa | 360/78.12 |
| 6,704,158 B2 | 3/2004 | Hawwa et al. | 360/77.16 |
| 6,728,077 B1 * | 4/2004 | Murphy | 360/294.4 |
| 6,961,221 B1 * | 11/2005 | Niu et al. | 360/294.4 |
| 2003/0147177 A1 | 8/2003 | Yao | 360/244.7 |
| 2004/0120081 A1 * | 6/2004 | Kurihara et al. | 360/294.4 |
| 2006/0044698 A1 * | 3/2006 | Hirano et al. | 360/294.4 |

* cited by examiner

*Primary Examiner*—Julie Anne Watko

(57) ABSTRACT

A suspension comprises a load beam having a leading portion and a trailing portion, a gimbal sheet mounted to the leading portion and forming a first pad, a second pad, and a displacement lever assembly including at least a first lever arm having a first end adjacent and connected to the first pad and a second end opposite the first end and connected to the second pad. The displacement lever assembly is configured to translate a linear displacement of the first pad to a differing displacement of the second pad. The suspension comprises a piezoelectric element attached to the first pad and extending across the second pad.

6 Claims, 9 Drawing Sheets

CO-LOCATED MICROACTUATOR LEVER ASSEMBLY

BACKGROUND

The present invention relates to a microactuator that may be used to actuate, for example, a suspension. Without limitation, the microactuator may be used in a disc drive suspension. More particularly, the present invention relates to a high resolution positioning mechanism having a co-located piezoelectric element and related lever assembly for moving a component connected to the lever assembly, such as moving a slider with respect to a rotatable disc.

Disc drives are well known in the magnetic storage industry. Disc drives are used to store digital information on rigid discs in a plurality of circular, concentric data tracks. Discs are mounted on a spindle motor that rotates the discs for operation. Information is read from or written to the disc surface via transducers carried on a slider supported relative to the disc surface via a suspension system.

Typically, the suspension assembly includes a load beam and a gimbal for supporting the slider. The slider is coupled to the gimbal at an upper surface of the slider. The gimbal is also coupled to the load beam. The lower surface of the slider defines an air-bearing surface. Rotation of a disc via the spindle motor interacts with the air-bearing surface of the slider to create a hydro-dynamic lifting force to lift the slider to fly above the disc surface for reading information from and writing information to the disc surface. The gimbal sheet supports the slider to allow the slider to pitch and roll relative to the disc surface for operation.

The load beam supplies a pre-load force to counteract the hydro-dynamic lifting force of the slider. The pre-load force supplied by the load beam and the hydro-dynamic lifting force created by the air-bearing surface and rotation of the disc define the flying characteristics of the slider (and transducers) above the disc surface.

Radial spacing between concentric data tracks on magnetic discs continues to decrease, requiring greater precision in head positioning. Conventionally, head positioning is accomplished by operating an actuator arm, which is attached to the suspension assembly, with a large-scale actuator motor, such as a voice coil motor. The large-scale motor lacks sufficient resolution to effectively accommodate high track density discs. Thus, a high-resolution head positioning mechanism is necessary to accommodate the more densely spaced tracks.

One design for high resolution head positioning involves employing a high resolution microactuator in addition to the conventional low resolution actuator motor, thereby effecting head positioning through dual stage actuation. Various microactuator designs have been considered to accomplish high resolution head positioning, including electromagnetic microactuators and more recently, piezoelectric micromotors. Use of a piezoelectric material as the microactuator appears quite promising, however, current implementations have shortcomings that limit the effectiveness of the microactuator.

For example, where the piezoelectric micromotor was offset from the slider, such as where the micromotor was implemented at the baseplate (where the actuator arm connects to the head suspension load beam), high forces were required from the microactuator to move the mass associated with the head suspension at a frequency high enough to support the bandwidth necessary for a given areal density. If the force was not great enough, the microactuator operated with lower natural frequency than was desirable, and the system could not support the bandwidth required. When the microactuator was co-located to the slider (where the microactuator is in direct contact or very close contact with the slider), such as where the microactuator was implemented directly on the slider, in one embodiment the complexity of slider design was increased and noise generated by the microactuator and by signal paths to it was induced into the head. New fabrication techniques had to be developed to integrate the slider and microactuator into a single structure. Therefore, the prior designs did not present ideal microactuator solutions.

There is a need in the art for a simple microactuator design to provide efficient high resolution head positioning in a dual-stage actuation system that can be implemented by readily available manufacturing processes.

SUMMARY

One embodiment of the invention provides a suspension. The suspension comprises a baseplate, load beam, and gimbal for the slider. The gimbal is fabricated to have a fixed section and a rotor section that are connected through a displacement lever, which at one end the slider is attached. A piezoelectric element is connected to both a pad on the rotor section and a pad on the stator section. As the piezoelectric element expands (d31 expansion), the displacement of the piezoelectric element is multiplied by the displacement lever and moves the slider in a linear displacement or a rotary motion depending on how the slider mounting end of the beam is constrained to the stator.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
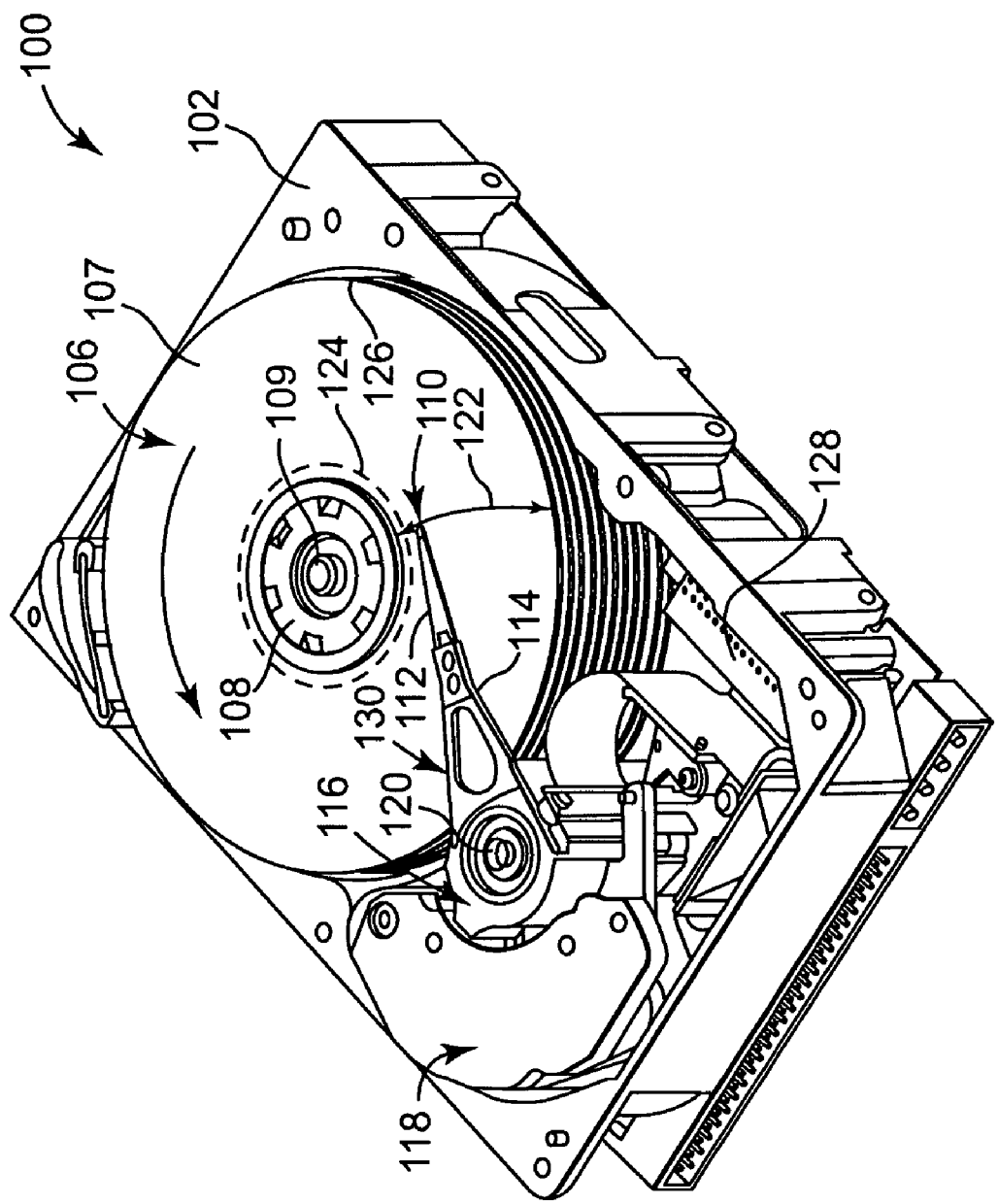
FIG. 1 is a diagram illustrating a perspective view of one embodiment of a disc drive.

FIG. 1 is a diagram illustrating a perspective view of one embodiment of a disc drive 100. Disc drive 100 can be configured as a magnetic disc drive, magneto optical disc drive, optical disc drive, or other suitable disc drive. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about a central axis 109. Each disc surface has an associated slider 110, which is mounted to disc drive 100 and carries a read/write head (not shown) for communication with the disc surface.

Disc drive 100 further includes dual-stage actuator assembly 130. Dual stage actuator assembly 130 includes suspensions 112 attached to track assessing arms (or actuator arms) 114. Each suspension 112 includes a gimbal sheet for supporting sliders 110 and a co-located microactuator for high-resolution positioning of the read/write heads of sliders 110 over desired disk tracks, as described in greater detail below.

Track accessing arms 114 are radially positioned by a first stage actuator 116. Actuator 116 is of the type known as a rotary moving coil actuator that includes a voice coil motor (VCM), shown generally at 118. Voice coil motor 118 rotates actuator 116 with its attached sliders 110 about a pivot shaft 120 to position sliders 110 over a desired track along a path 122 between a disc inner diameter 124 and a disc outer diameter 126. Voice coil motor 118 operates under control of servo-control circuitry 128. Other types of first stage actuators can also be used, such as linear actuators.

Figure 2:
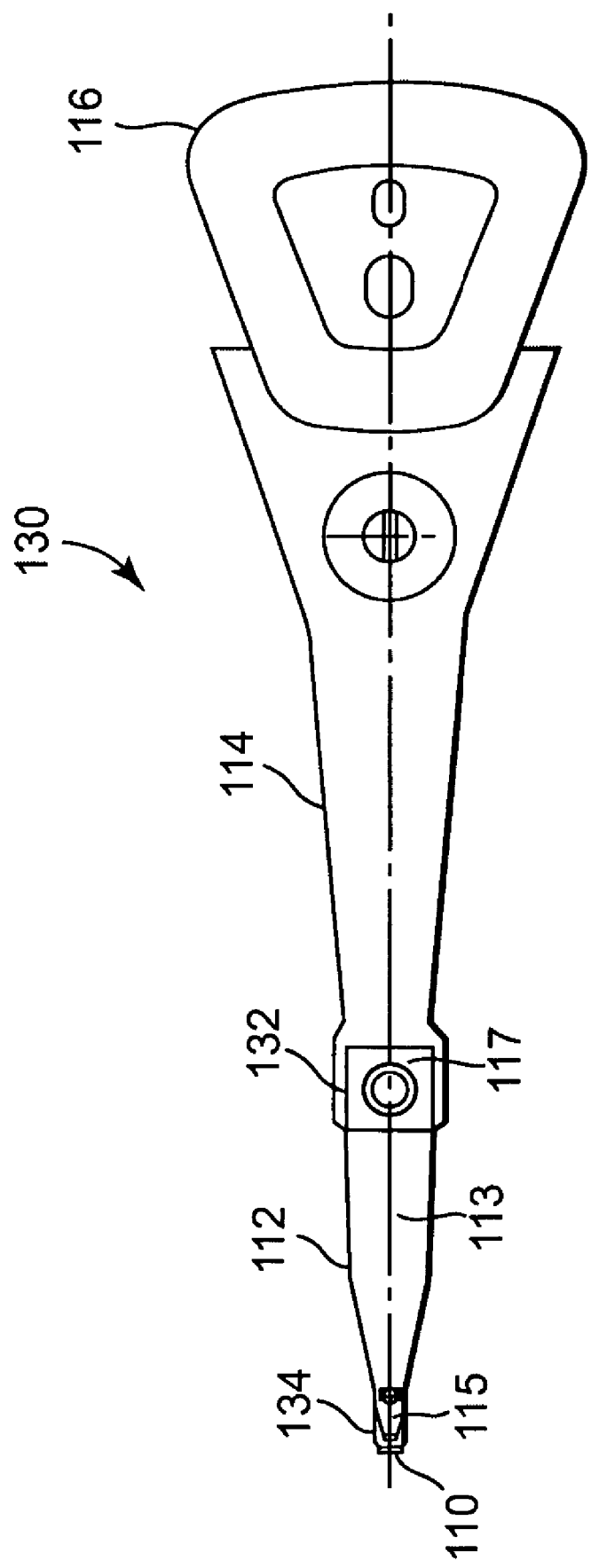
FIG. 2 is a diagram illustrating a top view of one embodiment of a single dual-stage actuator assembly.

FIG. 2 is a diagram illustrating a top view of a single dual-stage actuator assembly 130. Dual-stage actuator assembly 130 includes actuator 116, actuator arm 114, and suspension 112. Suspension 112 includes a load beam 113 having a leading portion 115 and a trailing portion 117. Leading portion 115 of load beam 113 is coupled to a gimbal or gimbal sheet 134, which in turn is coupled to a slider 110. In one embodiment, gimbal sheet 134 is made from sheet steel or other suitable material. Trailing portion 117 of load beam 113 is coupled to actuator arm 114 at 132 by swaging or another suitable technique. Actuator arm 114 is coupled to actuator 116.

In FIGS. 3-9, multiple embodiments of a gimbal sheet are illustrated and described. The gimbal sheets are schematically illustrated and may include other surface features (not shown) for effecting desired gimbal effect in addition to effecting microactuator movement.

Figure 3:
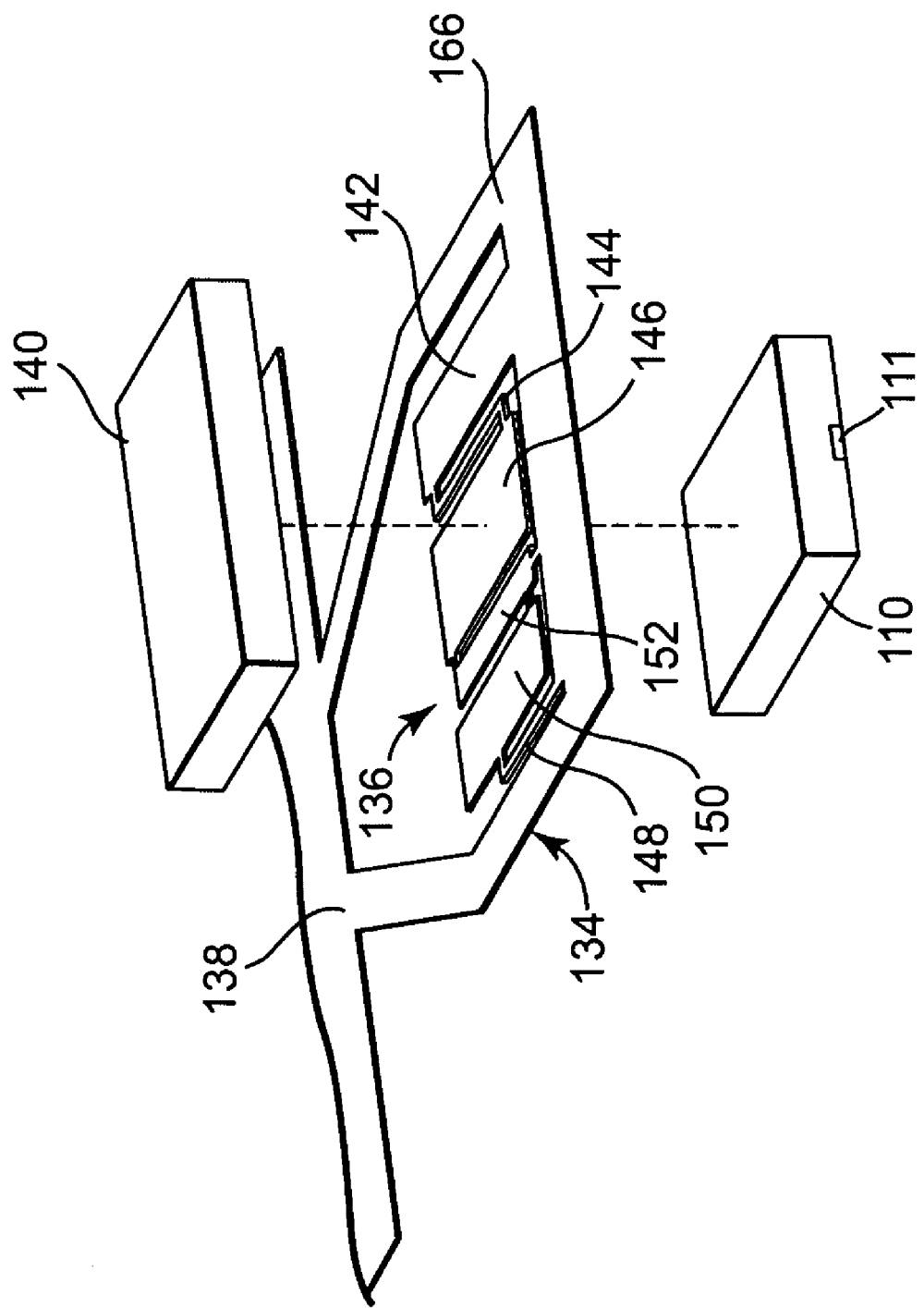
FIG. 3 is a diagram illustrating an exploded view of one embodiment of portions of a suspension, including a gimbal sheet with a piezoelectric element and a slider.

FIG. 3 is a diagram illustrating an exploded view of one embodiment of portions of suspension 112, including gimbal sheet 134, a piezoelectric element 140, and a slider 110. For ease of illustration, load beam 113 (FIG. 2) has been omitted from the view of FIG. 3. Gimbal sheet 134 includes a displacement lever assembly 136, which in one embodiment includes a frame 166, a stationary piezoelectric element pad 142, a moveable piezoelectric element pad 150, a moveable slider pad 146, a lever arm 152, and connecting legs 144 and 148. Slider 110 includes read/write head 111.

Co-located piezoelectric element 140 and slider 110 are coupled to gimbal sheet 134 to enable high-resolution positioning of read/write head 111 over a disc track. Displacement lever assembly 136 is configured to translate a linear displacement of moveable piezoelectric element pad 150 to a differing displacement of slider pad 146. One end of piezoelectric element 140 is coupled to stationary piezoelectric element pad 142 and another end of piezoelectric element 140 is coupled to moveable piezoelectric element pad 150 on a first major face 138 of gimbal sheet 134. Conversely, slider 110 is coupled to moveable slider pad 146 on a second major face (not visible) of gimbal sheet 134. In one embodiment, piezoelectric element 140 and slider 110 are coupled to gimbal sheet 134 using an adhesive. In one embodiment, piezoelectric element 140 comprises Lead Zirconate Titanate (PZT).

Figure 4:
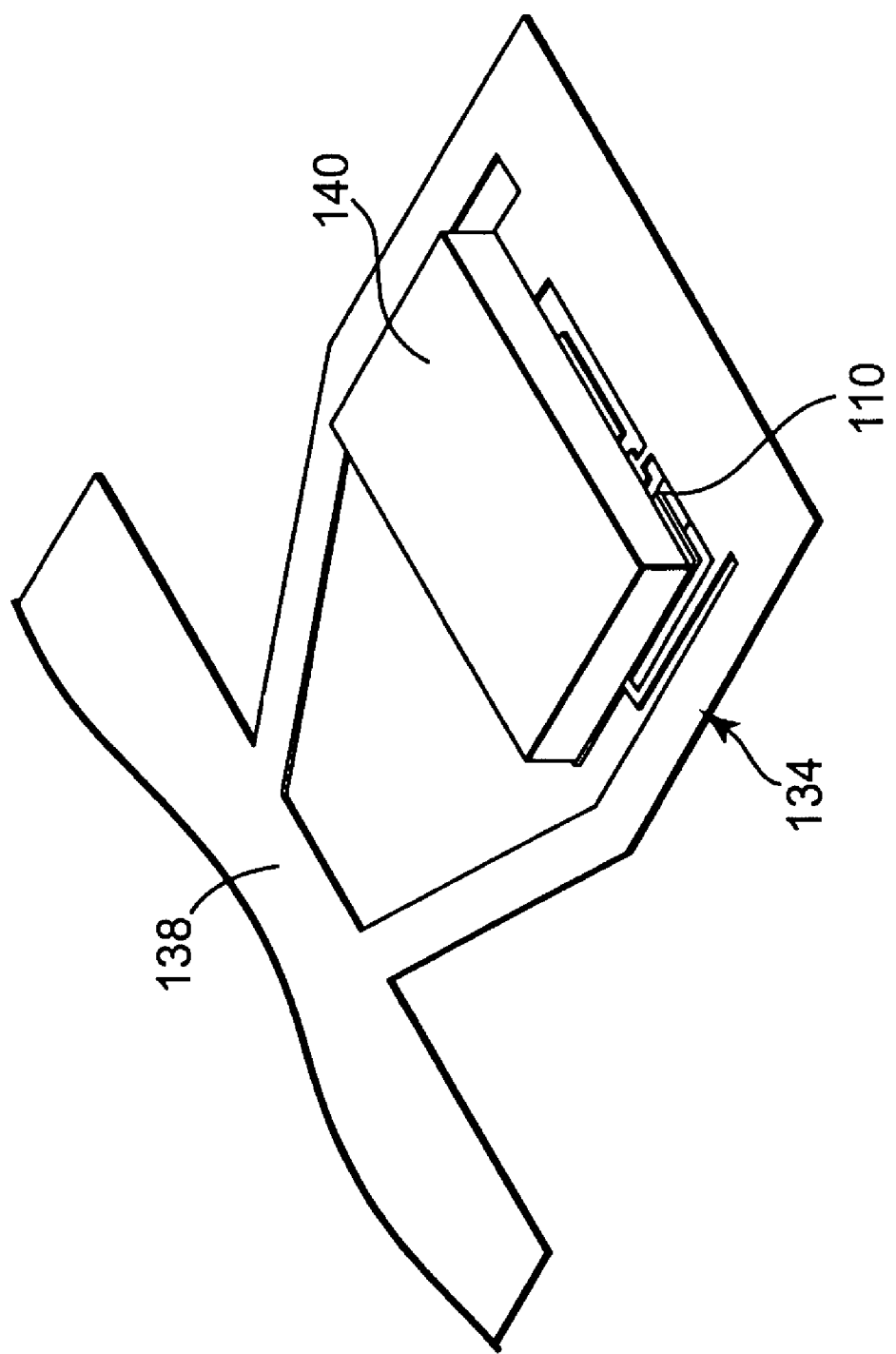
FIG. 4 is a diagram illustrating a perspective view of one embodiment of a gimbal sheet with a piezoelectric element and a slider mounted thereon.
Figure 5A:
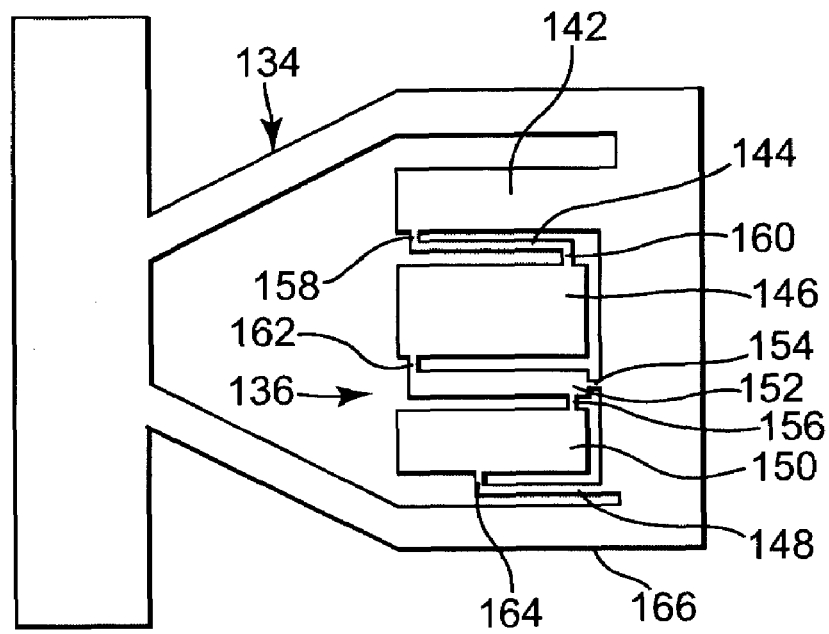
FIG. 5A is a diagram illustrating a top view of one embodiment of a gimbal sheet configured for linear displacement of a slider with the gimbal sheet in a neutral position.

FIG. 5A is a diagram illustrating a top view of one embodiment of gimbal sheet 134 configured for linear displacement of slider 110 (FIG. 4) with gimbal sheet 134 in a neutral position. For ease of illustration of gimbal sheet 134, piezoelectric element 140 and slider 110 have been omitted from the view of FIG. 5A. Gimbal sheet 134 includes stationary piezoelectric element pad 142, moveable piezoelectric element pad 150, slider pad 146, and displacement lever assembly 136. Displacement lever assembly 136 includes frame 166, lever arm 152, and connecting legs 144 and 148.

Frame 166 is connected to stationary piezoelectric element pad 142, moveable piezoelectric element pad 150 through connecting leg 148 including angular bend and pivot point 164, and lever arm 152 through pivot point 154. Stationary piezoelectric element pad 142 is connected to slider pad 146 through connecting leg 144 including angular bends and pivot points 158 and 160. Slider pad 146 is connected to moveable piezoelectric element pad 150 through lever arm 152 and pivot points 162 and 156.

FIG. 4 is a diagram illustrating a perspective view of one embodiment of gimbal sheet 134 with piezoelectric element 140 and slider 110 mounted thereon. Piezoelectric element 140 is coupled to the first major face 138 of gimbal sheet 134 and slider 110 is coupled to the opposite, second major face (not visible) of gimbal sheet 134.

Piezoelectric element 140 is electrically coupled to control circuitry (not shown) for controlling piezoelectric element 140. Piezoelectric element 140 is co-located to slider 110 as piezoelectric element 140 and slider 110 are both coupled to gimbal sheet 134. Piezoelectric element 140 is coupled to gimbal sheet 134 such that if piezoelectric element 140 is controlled to expand, slider 110 moves linearly in a first direction. If piezoelectric element 140 is controlled to contract, slider 110 moves linearly in a second direction opposite the first direction. By controlling piezoelectric element 140, read/write head 111 of slider 110 is precisely positioned over a desired track of a disk 107.

Returning to FIG. 5A, piezoelectric element 140 (FIG. 4) is coupled to stationary piezoelectric element pad 142 and moveable piezoelectric element pad 150. Piezoelectric element 140 can be controlled to either expand or contract. If the piezoelectric element is controlled to expand, pad 150 moves away from pad 142. If the piezoelectric element is controlled to contract, pad 150 moves toward pad 142. In response to the displacement of pad 150, lever arm 152 linearly displaces slider pad 146 in the same direction as pad 150. Depending on the length of lever arm 154, the displacement magnitude of slider pad 146 is different than the displacement magnitude of pad 150. For example, a smaller linear displacement of pad 150 can impose a larger linear displacement of pad 146 through lever arm 152.

Figure 5B:
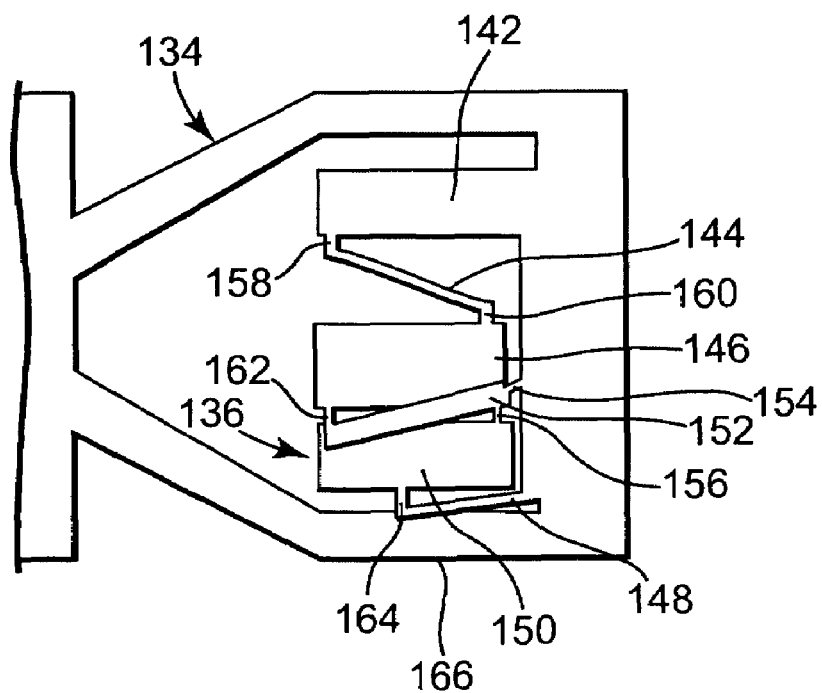
FIG. 5B is a diagram illustrating a top view of the embodiment of the gimbal sheet configured for linear displacement of a slider with the gimbal sheet in a displaced position.

FIG. 5B is a diagram illustrating a top view of the embodiment of gimbal sheet 134 configured for linear displacement of slider 110 with gimbal sheet 134 in a displaced position. For ease of illustration of gimbal sheet 134, piezoelectric element 140 and slider 110 have been omitted from the view of FIG. 5B. In this embodiment, piezoelectric element 140 has been controlled to expand resulting in pad 150 moving away from pad 142. In response to pad 150 moving away from pad 142, slider pad 146 is moved in the same direction as pad 150.

Unlike previous designs, co-located piezoelectric element 140 is attached to gimbal sheet 134 rather than directly to slider 110. Slider 110 is also attached to gimbal sheet 134 reducing the complexity of the slider design. In addition, lever arm 152 increases the mechanical advantage of piezoelectric element 140. The increased mechanical advantage allows a reduction in the size of piezoelectric element 140 or allows a reduction in the voltage requirements for piezoelectric element 140 in comparison to previous designs.

Figure 6:
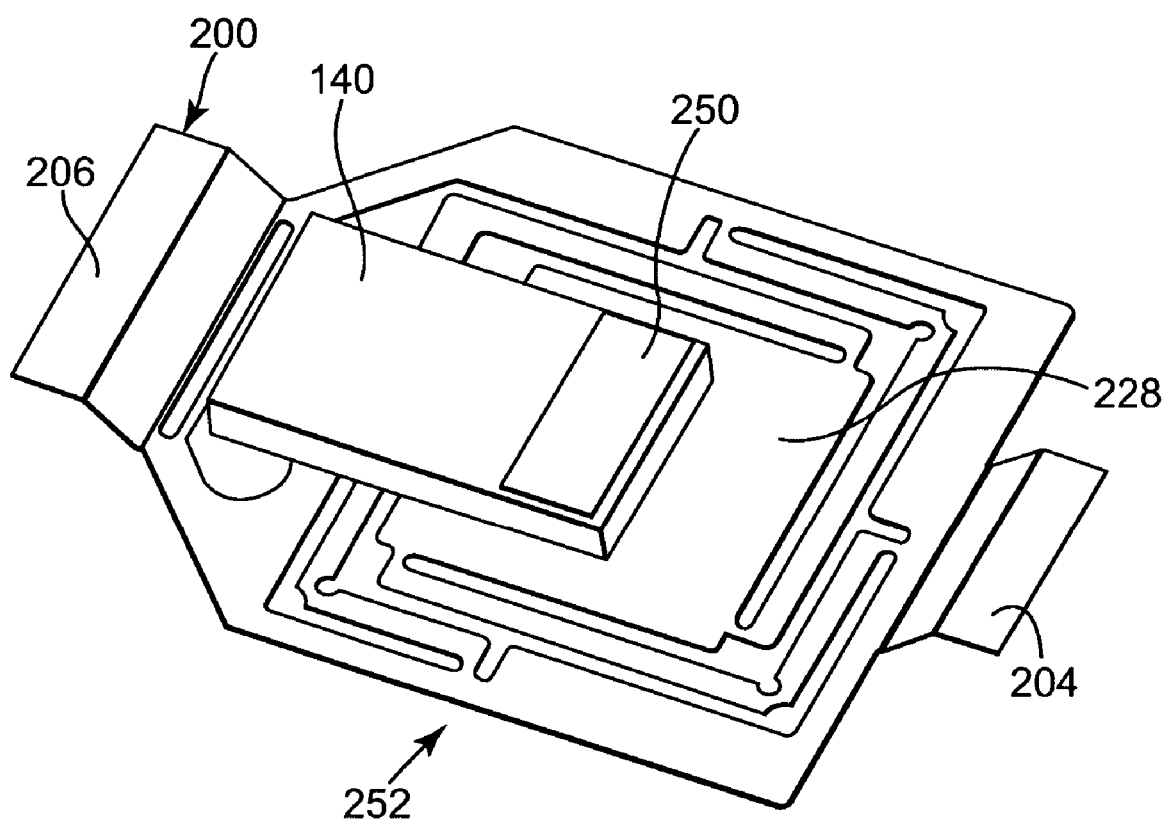
FIG. 6 is a diagram illustrating a perspective view of a portion of an alternative embodiment of a suspension, including a gimbal sheet and piezoelectric element that combine to support a slider.

FIG. 6 is a diagram illustrating a perspective view of a portion of an alternative embodiment of suspension 112, including a gimbal sheet 200 and piezoelectric element 140 that combine to support a slider (not shown). For ease of illustration, load beam 113 (FIG. 2) has been omitted from the view of FIG. 6. Gimbal sheet 200 includes a displacement lever assembly 252 and is configured for rotational displacement of the slider. Gimbal sheet 200 includes load beam mounting pads or attachment pads 204 and 206, a moveable piezoelectric element pad (not visible in view of FIG. 6), and a moveable slider pad 228.

One end of a first major face of piezoelectric element 140 is coupled to the moveable piezoelectric element pad and the opposite end of a second major face of piezoelectric element 140 is coupled to the load beam (not shown) at load beam mounting pad 250. As described in greater detail below, piezoelectric element 140 is controlled to expand or contract, which linearly displaces the moveable piezoelectric element pad. In response to the linear displacement of the piezoelectric element pad, slider pad 228 is rotationally displaced.

Figure 7A:
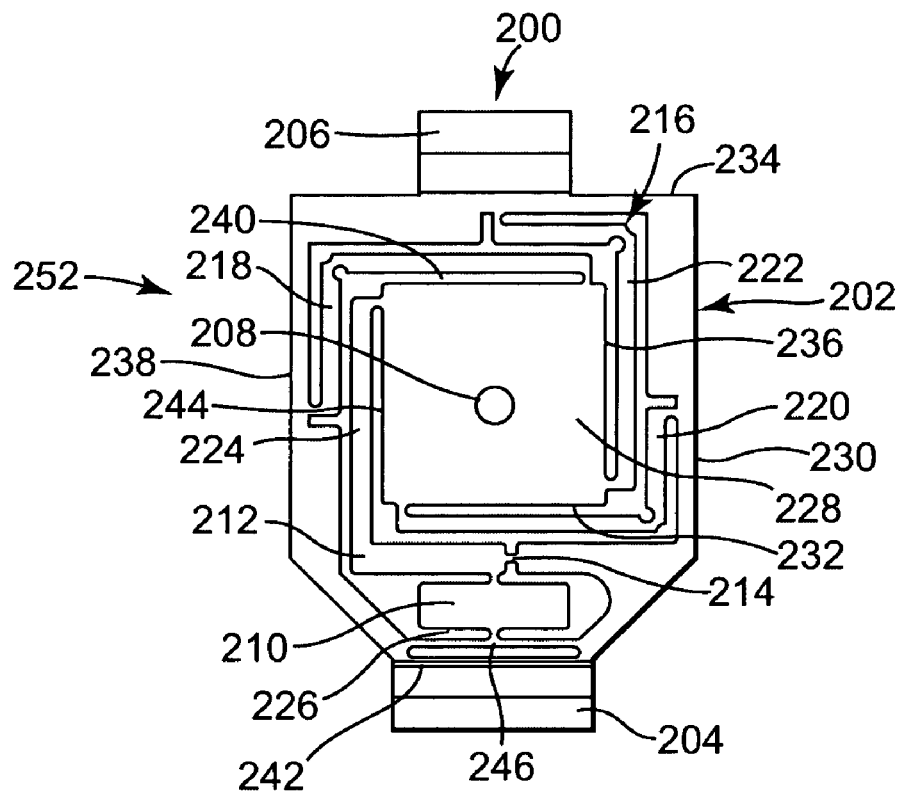
FIG. 7A is a diagram illustrating a top view of one embodiment of a gimbal sheet configured for rotational displacement of a slider with the gimbal sheet in a neutral position.

FIG. 7A is a diagram illustrating a top view of gimbal sheet 200 configured for rotational displacement of a slider with gimbal sheet 200 in a neutral position. Gimbal sheet 200 includes load beam mounting tabs 206 and 204 and displacement lever assembly 252. Displacement lever assembly 252 includes a frame 202, a piezoelectric element pad 210, connecting legs 222, 220, 224, and 218, a lever arm 212, a hinge 214, a deflection beam 246, and slider pad 228 with dimple 208.

A first side 230 of frame 202 is connected to a first side 232 of slider pad 228 through connecting leg 220. A second side 234 of frame 202 is connected to a second side 236 of slider pad 228 through connecting leg 222. A third side 238 of frame 202 is connected to a third side 240 of slider pad 228 through connecting leg 218. A fourth side 242 of frame 202 is connected to deflection beam 246. Deflection beam 246 is connected to one side of piezoelectric element pad 210. The opposite side of piezoelectric element pad 210 is connected to lever arm 212. Lever arm 212 is connected to frame 202 through hinge 214 and to the fourth side 244 of slider pad 228 through connecting leg 224. In one embodiment, connecting legs 222, 220, and 218 have stress relieving points at angular bends or pivot points in the connecting legs, such as indicated at 216. In one embodiment, the stress relieving points include notches in angular bends of the connecting legs. Although displacement lever assembly 252 is illustrated in FIG. 7A as including four connecting legs 218-224, any other suitable number of connecting legs can be used.

Upon final assembly, and with additional reference to FIG. 6, one end of one side of piezoelectric element 140 is coupled to piezoelectric element pad 210 and the opposite end of the opposite side of the piezoelectric element is coupled to the load beam (not shown). The piezoelectric element is controlled to expand to linearly move pad 210 away from load beam mounting pad 206 and contract to linearly move pad 210 toward load beam mounting pad 206. In response to the piezoelectric element contracting, piezoelectric element pad 210 exerts a rotational force on slider pad 228 through lever arm 212 resulting in rotational movement of slider pad 228 around dimple 208 in a first, clockwise direction. In response to the piezoelectric element expanding, piezoelectric element pad 210 exerts a rotational force on slider pad 228 through lever arm 212 resulting in rotational movement of slider pad 228 around dimple 208 in a second, counter-clockwise direction, opposite the first direction.

Figure 7B:
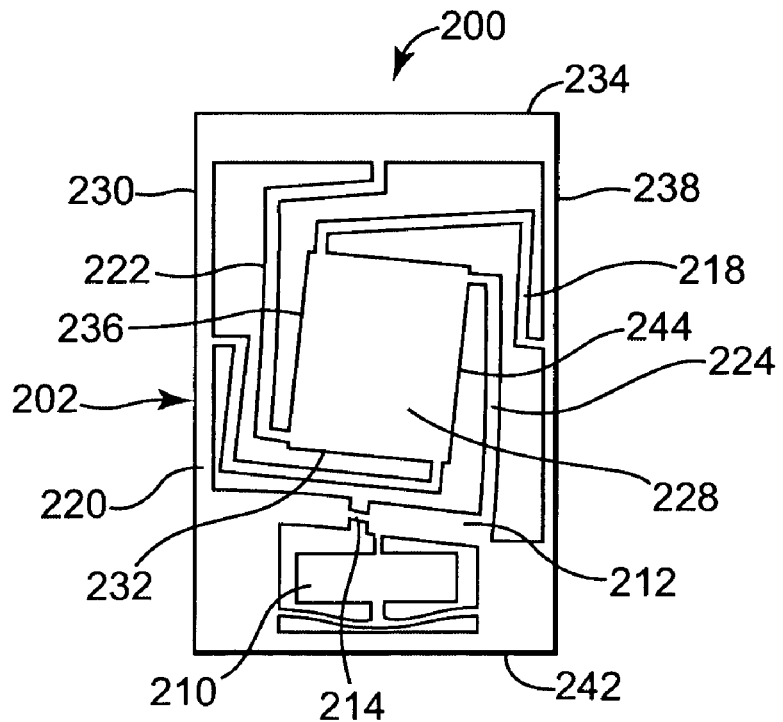
FIG. 7B is a diagram illustrating a bottom view of one embodiment of the gimbal sheet configured for rotational displacement of a slider with the gimbal sheet in a rotatated position.

FIG. 7B is a diagram illustrating a bottom view of one embodiment of gimbal sheet 200 configured for rotational displacement of a slider with gimbal sheet 200 in a rotated position. In this embodiment, the piezoelectric element (not shown) has been controlled to expand, resulting in pad 210 moving away from mounting pad 206. In response to pad 210 moving away from pad 206, slider pad 228 is rotationally displaced in the second direction.

Figure 8:
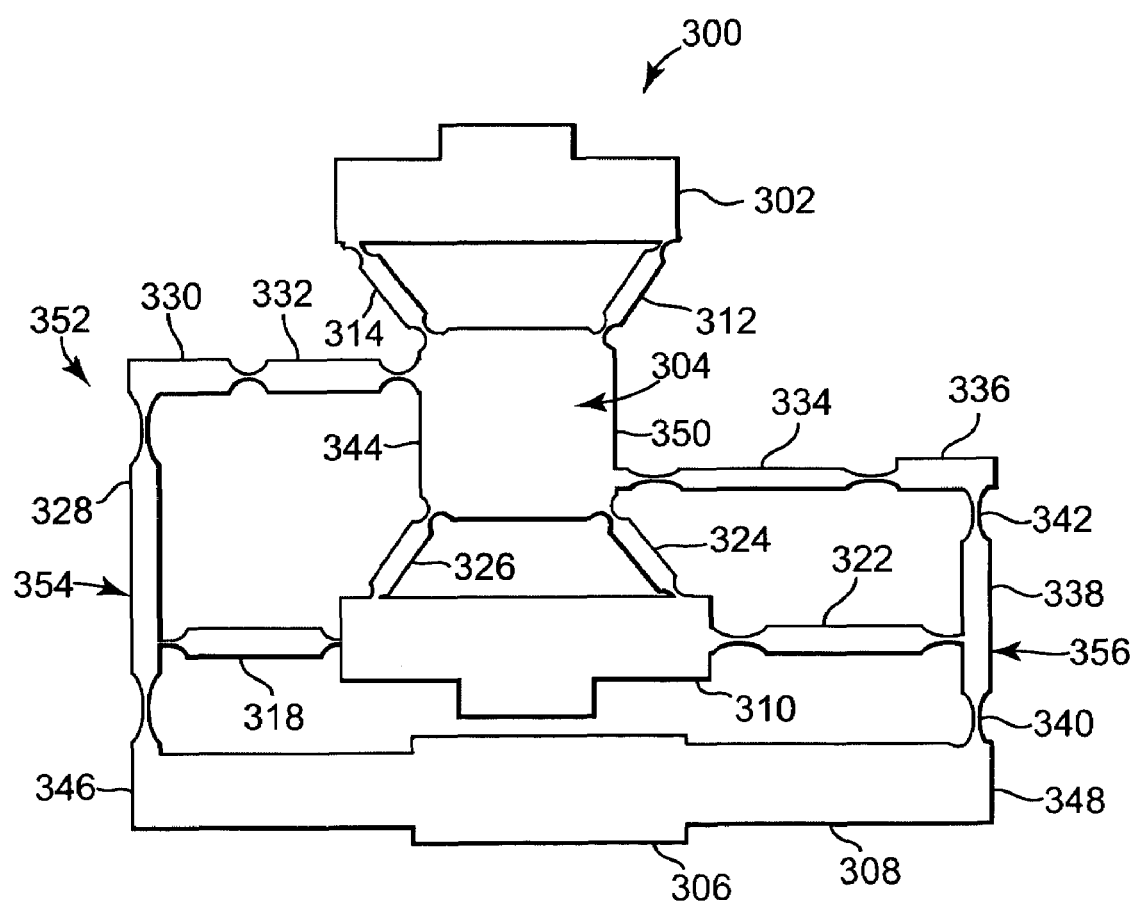
FIG. 8 schematically illustrates another embodiment of a portion of a suspension, including a gimbal sheet that supports a slider.

FIG. 8 schematically illustrates another embodiment of a portion of suspension 112, including a gimbal sheet 300 that supports a slider (not shown). For ease of illustration, load beam 113 (FIG. 2) has been omitted from the view of FIG. 8. Gimbal sheet 300 is configured for rotational displacement of the slider. Gimbal sheet 300 includes load beam mounting pads or attachment pads 302 and 310, a moveable piezoelectric element pad 306, a slider pad 304, and a displacement lever assembly 352. Displacement lever assembly 352 includes a first lever arm 354, a second lever arm 356, connecting legs 312, 314, 326, and 324, a first fulcrum arm 318, and a second fulcrum arm 322. First lever arm 354 includes lever arm portions 328, 330, and 332. Second lever arm 356 includes lever arm portions 338, 336, and 334. As described in greater detail below, displacement lever assembly 352 is adapted to effectuate rotation of slider pad 304 in response to linear displacement of piezoelectric element pad 306.

Load beam mounting pad 302 is connected to slider pad 304 through connecting legs 314 and 312. Load beam mounting pad 310 is directly connected to slider pad 304 through connecting legs 326 and 324. Load beam mounting pad 310 is indirectly connected to a first side 344 of slider pad 304 through the first fulcrum arm 318 and the first lever arm 354 and to a second side 350 of slider pad 304 through the second fulcrum arm 322 and the second lever arm 356. Piezoelectric element pad 306 is connected to the first side 344 of slider pad 304 through piezoelectric element bar 308 and the first lever arm 354 and to the second side 350 of slider 304 through piezoelectric element bar 308 and the second lever arm 356. One side of piezoelectric element bar 308 is connected to one side of load beam mounting pad 310 through lever arm portion 328 and fulcrum arm 318 and the other side of piezoelectric element bar 308 is connected to the other side of load beam mounting pad 310 through lever arm portion 338 and fulcrum arm 322.

Connecting legs 312, 314, 326, and 324, fulcrum arms 318 and 322, and lever arm portions 332, 330, 328, 334, 336, and 338 each include two opposing portions, such as indicated at 340 and 342, where the connecting leg, fulcrum arm, or lever arm portion connects to a another connecting leg, fulcrum arm, lever arm portion, or to load beam mounting pads 302 or 310, slider pad 304, or piezoelectric element bar 308. The opposing portions, such as 340 and 342 are narrower than the rest of the connecting leg, fulcrum arm, or lever arm portion to allow for flexing at the connection points between the connecting legs, fulcrum arms, lever arm portions, or to load beam mounting pads 302 or 310, slider pad 304, or piezoelectric element bar 308.

One end of one side of a piezoelectric element (not shown) is coupled to moveable piezoelectric element pad 306 and the opposite end of the opposite side of the piezoelectric element is mounted to the load beam in a manner similar to how piezoelectric element 140 is mounted to the load beam as illustrated in FIG. 6. If the piezoelectric element is controlled to expand, moveable piezoelectric element pad 306 moves away from load beam mounting pad 310. The movement of piezoelectric element pad 306 away from load beam mounting pad 310 imposes a rotational force on slider pad 304 through the first lever arm 354 and the second lever arm 356. The rotational force on slider pad 304 results in slider pad 304 rotating in a first, counter-clockwise direction.

If the piezoelectric element is controlled to contract, moveable piezoelectric element pad 306 moves toward load beam mounting pad 310. The movement of piezoelectric element pad 306 toward load beam mounting pad 310 imposes a rotational force on slider pad 304 through the first lever arm 354 and the second lever arm 356. The rotational force on slider pad 304 results in slider pad 304 rotating in a second, clockwise direction, opposite the first direction.

Figure 9:
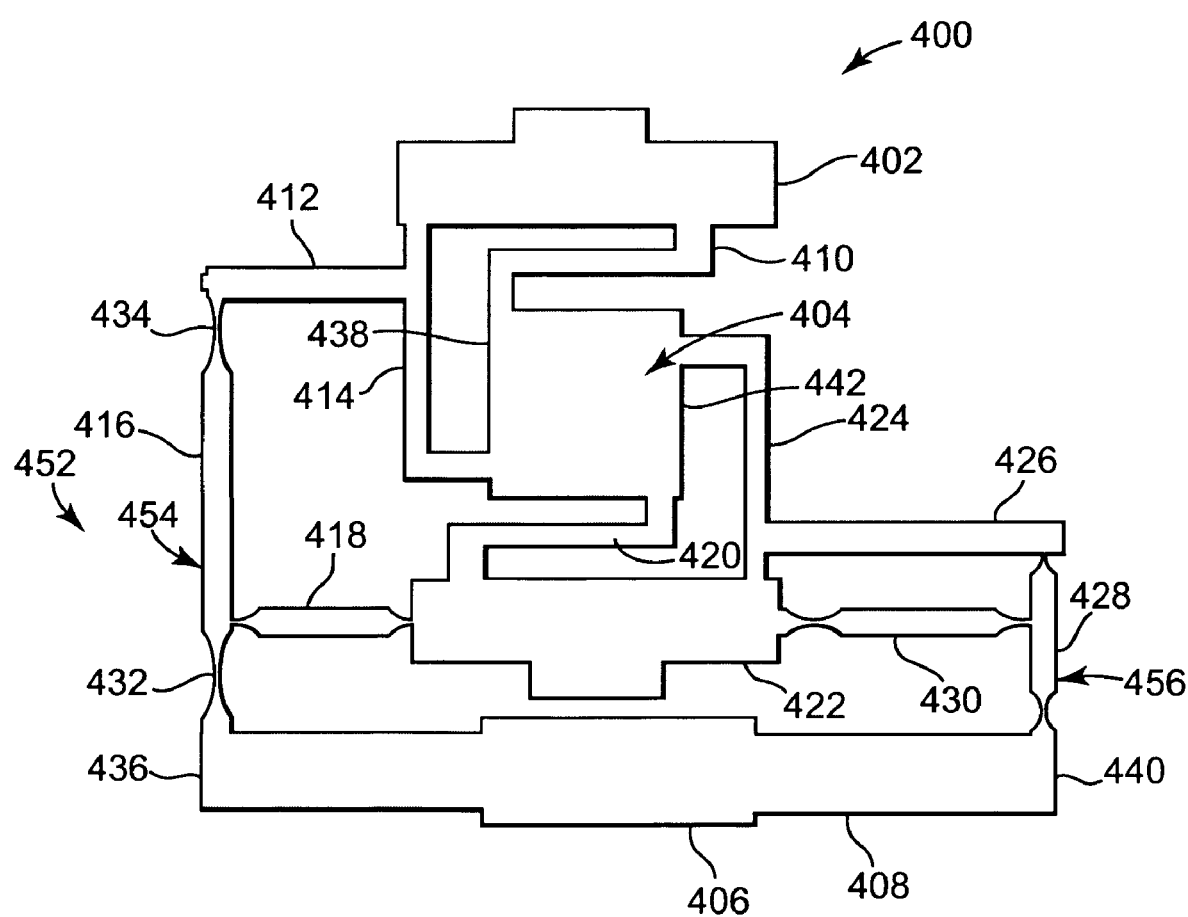
FIG. 9 schematically illustrates another embodiment of a portion of a suspension, including a gimbal sheet that supports a slider.

FIG. 9 schematically illustrates another embodiment of a portion of suspension 112 including a gimbal sheet 400 that supports a slider (not shown). For ease of illustration, load beam 113 (FIG. 2) has been omitted from the view of FIG. 9. Gimbal sheet 400 is configured for rotational displacement of the slider. Gimbal sheet 400 includes load beam mounting pads or attachment pads 402 and 422, a slider pad 404, a moveable piezoelectric element pad 406, and a displacement lever assembly 452. Displacement lever assembly 452 includes a first lever arm 454, a second lever arm 456, a first fulcrum arm 418, a second fulcrum arm 430, and connecting legs 410, 414, 420, and 424. First lever arm 454 includes lever arm portions 416 and 412. Second lever arm 456 includes lever arm portions 428 and 426. As described in greater detail below, displacement lever assembly 452 is adapted to effectuate rotation of slider pad 404 in response to linear displacement of piezoelectric element pad 406

Load beam mounting pad 402 is connected to slider pad 404 through connecting legs 410 and 414. Load beam mounting pad 422 is directly connected to slider pad 404 through connecting legs 420 and 424. Load beam mounting pad 422 is indirectly connected to a first side 438 of slider pad 404 through first fulcrum arm 418, first lever arm 454, and connecting leg 414, and to a second side 442 of slider pad 404 through second fulcrum arm 430, lever arm 456, and connecting leg 424. Moveable piezoelectric element pad 406 is connected to the first side 438 of slider pad 404 through piezoelectric element bar 408, first lever arm 454, and connecting leg 414, and to the second side 442 of slider pad 404 through piezoelectric element bar 408, second lever arm 456, and connecting leg 424.

Fulcrum arms 418 and 430 and lever arm portions 416 and 428 each include two opposing portions, such as indicated at 432 and 434, where the fulcrum arm or lever arm portion connects to a connecting leg or to load beam mounting pad 422 or piezoelectric element bar 408. The opposing portions, such as 432 and 434 are narrower than the rest of the fulcrum arm or lever arm portion to allow for flexing at the connection points between the connecting legs, fulcrum arms, lever arm portions, load beam mounting pad 422, and piezoelectric element bar 408.

One end of one side of a piezoelectric element (not shown) is coupled to moveable piezoelectric element pad 406 and the opposite end of the opposite side of the piezoelectric element is mounted to the load beam in a manner similar to how piezoelectric element 140 is mounted to the load beam as illustrated in FIG. 6. If the piezoelectric element is controlled to expand, moveable piezoelectric element pad 406 moves away from load beam mounting pad 422. The movement of piezoelectric element pad 406 away from load beam mounting pad 422 imposes a rotational force on slider pad 404 through the first lever arm 454 and the second lever arm 456. The rotational force on slider pad 404 results in slider pad 404 rotating in a first, counter-clockwise direction.

If the piezoelectric element is controlled to contract, moveable piezoelectric element pad 406 moves toward load beam mounting pad 422. The movement of piezoelectric element pad 406 toward load beam mounting pad 422 imposes a rotational force on slider pad 404 through the first lever arm 454 and the second lever arm 456. The rotational force on slider pad 404 results in slider pad 404 rotating in a second, clockwise direction, opposite the first direction.

The embodiments of the present invention provide a marked improvement over previous designs. In particular, the present invention represents a viable, co-located microactuator configuration by attaching the slider and piezoelectric element to opposite sides of a gimbal sheet. This microactuator configuration simplifies the slider design and the electrical connections to the piezoelectric element and the slider. In addition, the mechanical advantage achieved through the gimbal sheet displacement lever assembly allows for reducing the size of the piezoelectric element or reducing the voltage requirement for the piezoelectric element in comparison to previous designs.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A suspension comprising:
    a load beam having a leading portion and a trailing portion;
    a gimbal mounted to the leading portion of the load beam, and having a fixed section and a rotor section connected together by a displacement lever assembly, said rotor section having a first pad and said rotor section having a second pad, wherein the displacement lever assembly is configured to translate a linear displacement of the first pad to a differing displacement of the second pad; and
    a piezoelectric element attached to the first pad and extending across the second pad,
        wherein the displacement lever assembly includes a lever arm and is configured such that with linear displacement of the first pad, a first end of the lever arm experiences a displacement that is different from a displacement of a second end of the lever arm, further wherein the first pad, the second pad, and the lever arm are movably connected to the fixed section, wherein the first end of the lever arm is connected to the fixed section, and the second pad defines a plurality of sides, the displacement lever assembly further comprising:

a first leg extending from the second end of the lever arm to a first side of the second pad; and a second leg extending from a second side of the second pad to the fixed section.

2. The suspension of claim 1, wherein each of the legs forms at least one angular bend.

3. The suspension of claim 1, wherein the displacement lever assembly further comprises:

a third leg extending from a third side of the second pad to the fixed section; and a fourth leg extending from a fourth side of the second pad to the fixed section.

4. The suspension of claim 1, wherein a first end section of the piezoelectric element is attached to the first pad and a second end section of the piezoelectric element is attached to the load arm.

5. The suspension of claim 1, wherein the displacement lever assembly is configured such that the differing displacement includes at least one of a different displacement magnitude and a different displacement direction.

6. The suspension of claim 1, wherein the displacement lever assembly further includes a third pad rigidly affixed to the fixed section, with the second pad being positioned between the first and third pads, and further wherein the piezoelectric element is attached to the third pad.

* * * * *